(12) United States Patent
Prevost et al.

(10) Patent No.: US 6,176,590 B1
(45) Date of Patent: Jan. 23, 2001

(54) MOTOR VEHICLE LIGHTING SYSTEM HAVING AT LEAST TWO BEND LIGHTING DRIVING LIGHTS

(75) Inventors: André Prevost, Mennecy; Joël Leleve, Epinay sur Seine, both of (FR)

(73) Assignee: Valeo Vision, Bobigny (FR)

( * ) Notice: Under 35 U.S.C. 154(b), the term of this patent shall be extended for 0 days.

(21) Appl. No.: 09/038,794

(22) Filed: Mar. 11, 1998

(30) Foreign Application Priority Data

Mar. 13, 1997 (FR) .................................................. 97.03002

(51) Int. Cl.[7] .................................................. B60Q 1/12
(52) U.S. Cl. .................................. 362/37; 362/464; 315/81
(58) Field of Search .................................. 362/464, 465, 362/466, 37, 276, 802, 40; 315/81

(56) References Cited

U.S. PATENT DOCUMENTS

| 5,099,400 | * | 3/1992 | Lee | 362/37 |
|---|---|---|---|---|
| 5,404,278 | * | 4/1995 | Shibata et al. | 315/81 |
| 5,410,456 | * | 4/1995 | Sibata et al. | 362/40 |
| 5,526,242 | * | 6/1996 | Takahashi et al. | 362/37 |
| 5,567,032 | * | 10/1996 | Heizmann | 362/37 |
| 5,754,100 | * | 5/1998 | Park | 362/37 |
| 5,798,911 | * | 8/1998 | Josic | 362/37 |
| 5,868,488 | * | 2/1999 | Speak et al. | 362/37 |

FOREIGN PATENT DOCUMENTS 130 815   3/1929   (CH) .

OTHER PUBLICATIONS

French Search Report dated Oct. 10, 1997.

* cited by examiner

Primary Examiner—Thomas M. Sember
(74) Attorney, Agent, or Firm—Morgan & Finnegan, LLP

(57) ABSTRACT

A lighting system for a motor vehicle includes at least two short range driving lights with chopped beams, for illuminating bends in the road. The system includes a control unit for controlling the power supplied to the short-range (bend lighting) driving lights as a function of the steering deflection of the wheels of the vehicle.

21 Claims, 2 Drawing Sheets

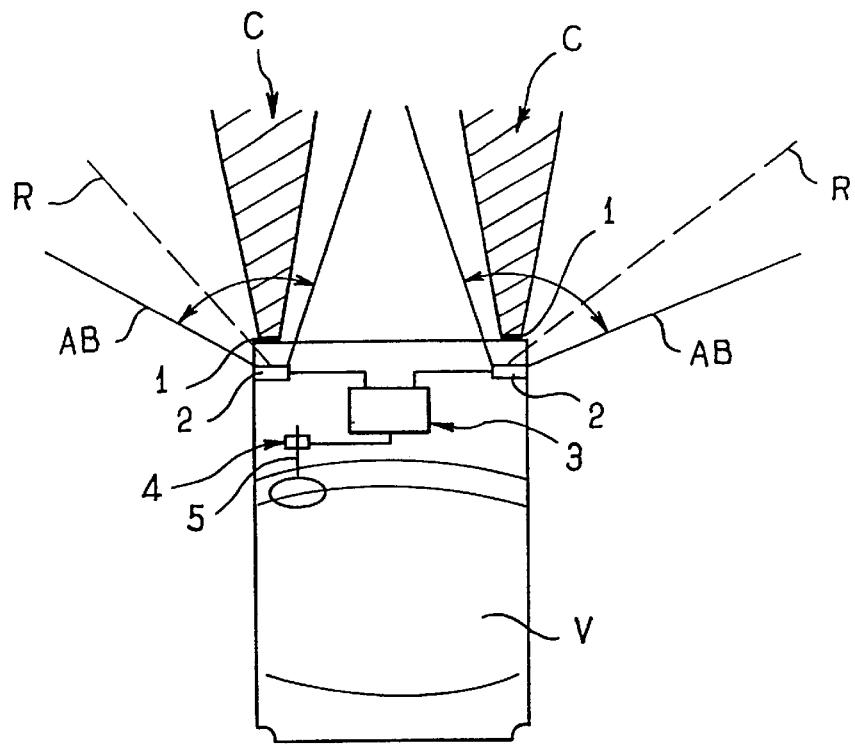
FIG_1
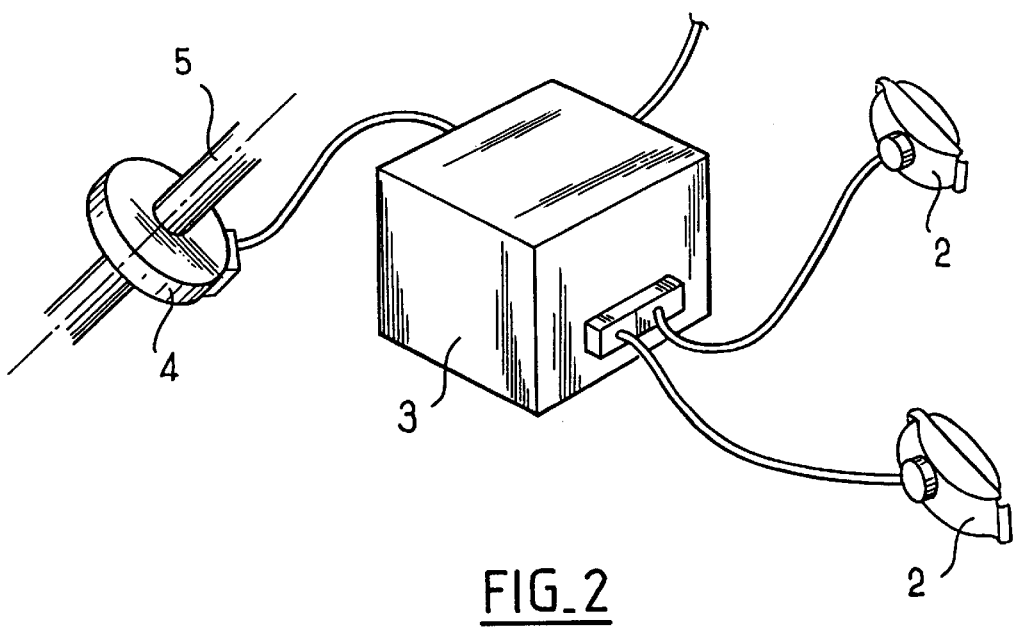
FIG_2

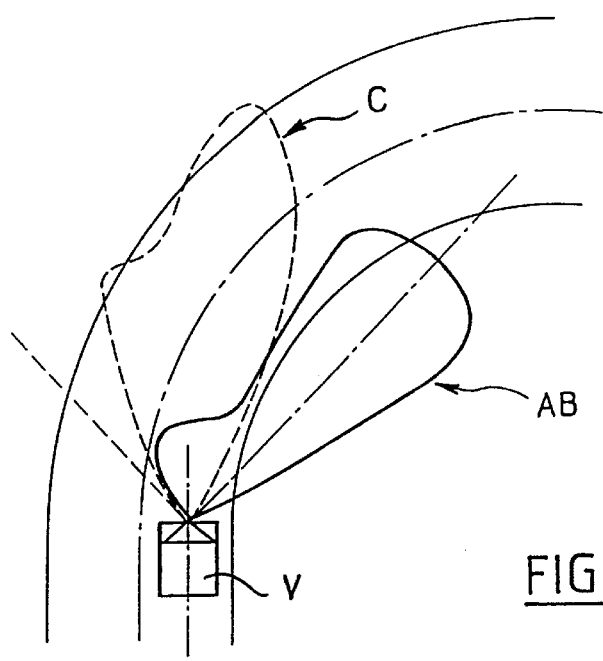
FIG_3
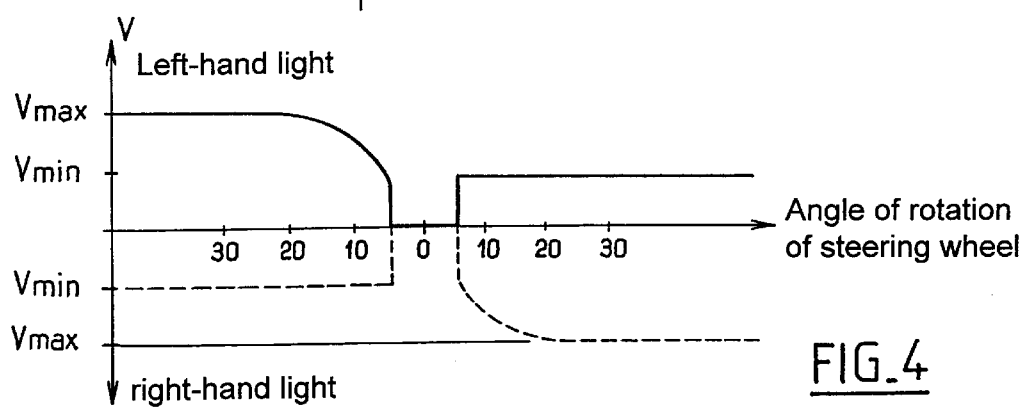
FIG_4
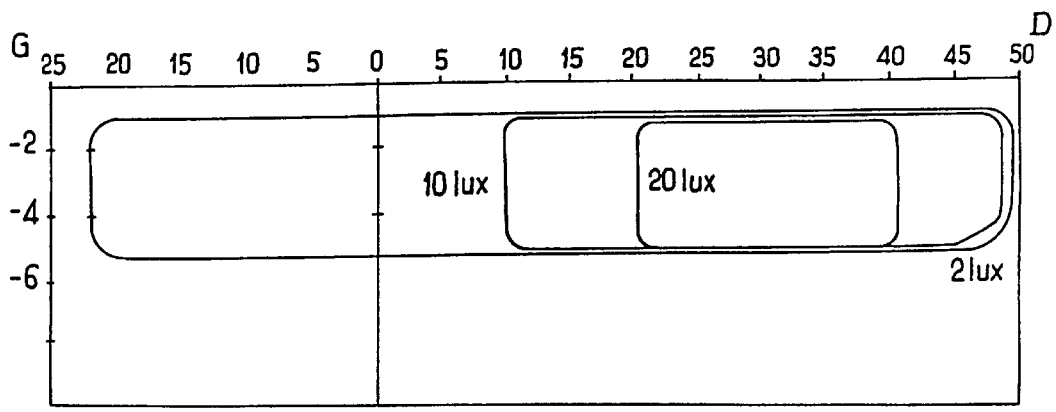
FIG_5

MOTOR VEHICLE LIGHTING SYSTEM HAVING AT LEAST TWO BEND LIGHTING DRIVING LIGHTS

FIELD OF THE INVENTION

The present invention relates to lighting systems for motor vehicles, comprising driving lights which include lights having a bend-lighting function, for example, of lighting the road ahead of the vehicle, on the side towards which the vehicle is turning when being steered on a bend in the road. Such lights will be referred to as "bend lighting driving lights".

BACKGROUND OF THE INVENTION

The bend-lighting function enables the verges of the road, on the nearside of the vehicle, close to which the vehicle is travelling when passing round a bend, to be illuminated in front and to the side of the vehicle.

For a driving light such as a headlight having a main beam, is known to provide the bend lighting function when the orientation of the reflector of this headlight varied. However, the varying technique cannot be used in the case of short-range illumination (close to the vehicle), in which rotation of the beams would involve alterations in the adjustment of the projection of the beam on the ground. This would be incompatible with lighting regulations.

DISCUSSION OF THE INVENTION

An object of the invention is to provide a lighting system for a motor vehicle which will provide a satisfactory bend lighting function for short range driving lights.

According to the invention, a lighting is provided for a motor vehicle, comprising at least two bend lighting driving lights (as defined above), of the type having a transverse cut-off, for emitting beams that illuminate bends in the road, including means for controlling the power supplied to the lights as a function of the steering deflection of the wheels of the vehicle.

According to a preferred feature of the invention, the lighting system includes a sensor which measures rotation of the steering column of the vehicle, a control unit which receives input signals corresponding to the measurements taken by the sensor and which controls the power supplied to the bend lighting driving lights in response to these measurements. Preferably, the control system includes filtering unit for filtering the measurements from the sensor.

Preferably, the control unit comprises computer means and a power circuit.

According to another preferred feature of the invention, the control means maintains the bend lighting driving lights extinguished as long as the steering deflection of the wheels of the vehicle is below a predetermined threshold value.

According to a further preferred feature of the invention, the control increase the supply of power to the bend lighting driving light which is situated on the side towards which the vehicle is turning, progressively with the steering deflection of the wheels of the vehicle.

In preferred embodiments having the two last mentioned features, the control unit supply a constant power to the bend lighting driving light which is situated on the side opposite the side towards which the vehicle is turning bend lighting driving light.

The control unit preferably includes electronic converters for supplying a temporary over-voltage to the bend lighting driving light which is situated on the side towards which the vehicle is turning, in order to improve the illumination given by the latter when the steering deflection of the wheels of the vehicle becomes high.

Preferably, both of the bend lighting driving lights are lit simultaneously and extinguished simultaneously.

Further features and advantages of the invention will appear more clearly on a reading of the following detailed description of preferred embodiments of the invention, which is given by way of non limiting example only and with reference to the accompanying drawings.

BRIEF DESCRIPTION OF THE DRAWINGS

FIGS. 1 and 2 are two diagrammatic representations showing a lighting system in one possible embodiment of the invention.

FIG. 3 is a diagrammatic representation which shows one possible form taken by the bend lighting function with a system of the kind shown in FIGS. 1 and 2.

FIG. 4 is a graph showing the supply voltage for the driving lights having the bend lighting function in the system of FIGS. 1 and 2, as a function of the angle of rotation of the steering wheel of the vehicle.

FIG. 5 is a chart showing the isolux distribution of the illumination given by a foglight.

DESCRIPTION OF PREFERRED EMBODIMENTS OF THE INVENTION

The lighting system shown in FIGS. 1 and 2 comprises two headlights 1 for forward emission of short-range (dipped) beams close to each other, and two short-range driving lights 2 for lateral illumination, which are disposed in the front of the vehicle V, on each side of the vehicle, and which are mounted in fixed positions on the vehicle.

The driving lights 2 are preferably lights with a chopped beam having a transverse cut-off line, for example foglights. The lighting system also include long range headlights, the reflectors of which are, for example, disposed in a common housing with the reflectors of the short range headlights 1.

In FIG. 1, the beams emitted by the foglights 2 are indicated by the reference AB, while those emitted by the short range headlights 1 are indicated at C.

The two lights 2 are connected to a control unit 3 which controls their power supply in accordance with information relating to the steering of the wheels of the vehicle. This information is supplied to the control unit 3 by a sensor 4 which follows the rotations of the steering column 5 of the vehicle, so as to give output signals representing the steering deflection of the road wheels of the vehicle.

The supply of power to the control unit 3, and to the lights 2 via the control unit 3, is, for example, obtained through the supply of power to the short range headlights 1. However, in this case the beam steering function is only activated when the short range headlights 1 are lit, and it is therefore not available for the long range, or main beam, headlights. In another version, the control unit 3 may be directly connected to a power supply terminal at the battery voltage, so that it receives as input signals the power supply voltages of the short range lights 1 and the associated long range lights, so and thereby controls the bend lighting function and the power supply to the lights 2 when either the short range headlights 1 or the long range headlights are lit.

The control unit 3 includes a computer which performs a filtering operation on measurements of angles of rotation of the steering column, and which determines, as a function of the measurements the power supply voltages which are to be delivered to the foglights 2. It also includes an amplifier circuit which generates the power supply voltages for the driving lights in response to the output signal from the computer means.

The control voltages delivered by the control unit 3 are for example of the "all or nothing" type, with the lights 2 being lit when the steering angle exceeds a given value. In order to conform with statutory limitations, the two lights 2 are lit simultaneously and extinguished simultaneously.

A threshold value of the above mentioned steering deflection, below which the lights 2 are not lit, is selected so as to be high enough not to cause frequent sequences of lighting and extinction of the lights 2 to occur, which could be troublesome for the driver.

In another version, the control unit 3 may easily be adapted, using known techniques, to control both of the two lights 2 with separate power supply voltages, as is shown in FIG. 3, such that the illumination of one or an other side of the road is enhanced according to whether the vehicle is steering to the right or the left.

In the example shown in FIG. 3, the vehicle is moving along a part of the road which is curved to the right, and the right hand bend lighting driving light 2 of the vehicle is supplied with a voltage which is higher than the supply voltage to the left-hand light 2. For example, such a lighting pattern corresponds for example to a control law of the type shown in FIG. 4.

With reference to the graph shown in FIG. 4, the supply voltages to the left-hand bend lighting driving light 2 of the vehicle, and to the corresponding right-hand light 2, are indicated in full lines and broken lines respectively as a function of the angle of rotation of the steering wheel. In this graph the angle 0 corresponds to a zero steering deflection of the wheels of the vehicle, i.e. it corresponds to the vehicle moving straight ahead. When operating with this control law, the lights 2 are extinguished as long as the angle of rotation of the flywheel is below a given threshold, which may for example be 5°. Beyond this figure, the light 2 which is situated on the side towards which the vehicle is turning (here the right-hand one) is supplied with a voltage which increases progressively from a minimum value $V_{min}$ (for example 8 to 9 volts), until it reaches a maximum supply value $V_{max}$ for an angle of rotation of the steering wheel which is for example 30°. The other light 2, situated on the opposite side of the vehicle, the side on the outside of the curve in the road, is itself supplied at the above mentioned minimum voltage $V_{min}$.

The maximum supply voltage is for example a battery voltage. It may equally be arranged that the power circuit of the control unit 3 includes electronic converters which enable a temporary over-voltage to be supplied to the driving lights 2, or to one of them, more particularly the one on the side towards which the vehicle is turning (the right-hand light 2, in FIG. 3), in order to improve the bend lighting function when the vehicle is being steered in a sharp curve.

The lighting system just described has a number of advantages. In particular, it enables a bend lighting function to be obtained without any moving parts, and consequently without making it necessary to provide any mechanisms for driving reflectors, or even headlights, in rotation.

In addition, this lighting system is easy to fit. In particular, emplacements for foglights are provided in most vehicles. In addition, sensors for measuring the rotation of the steering wheel already exist in certain vehicles, especially vehicles at the top of their product range. Moreover, the control unit, which consists of a computer and a power stage at the output, is very simple from the technical point of view.

What is claimed is:

1. A motor vehicle having steering unit and a lighting apparatus, the lighting apparatus comprising:
   at least two driving lights with cut-off beams for illuminating bends in a road ahead of the vehicle and a controlling unit for varying an amount of power supplied to the driving lights as a function of the position of the steering unit.

2. Apparatus according to claim 1, wherein the steering unit includes a rotatable steering column and wherein the lighting apparatus further includes a sensor connected to the steering column for measuring at least one rotation of the column, the control unit receiving a plurality of input signals, each input signal corresponding to a rotation measurement of the steering column, the control unit further varying the amount of power supplied to the lights as a function of the measurements.

3. Apparatus according to claim 2, wherein the control unit further includes a filtering unit for filtering the signals.

4. Apparatus according to claim 2, wherein the first control unit comprises a power output circuit and a computer connected to power output circuit, wherein the computer controls the power output circuit.

5. Apparatus according to claim 1, wherein the control unit keeps the lights extinguished until the steering deflection exceeds a predetermined threshold value.

6. Apparatus according to claim 1, wherein the bend lighting driving lights comprise a first light and a second light, the first light being on a side of the vehicle towards which the vehicle is turning and the second light being on the opposite side of the vehicle steered on a bend, and wherein the control unit progressively increases an amount of power supplied to the first light according to the position of the steering unit.

7. Apparatus according to claim 6, wherein the control unit keeps the lights extinguished until the steering deflection exceeds a predetermined threshold value and supplies the second light with constant power beyond the threshold value of the position of the steering unit.

8. Apparatus according to claim 6, wherein the control unit further includes an electronic converter for temporarily supplementing the power supplied to the first light to enhance the illumination given by the first light at high values of the steering deflection.

9. Apparatus according to claim 1, wherein the control unit energizes the bend lighting driving lights simultaneously and extinguishes the lights simultaneously.

10. A lighting apparatus for a vehicle comprising:
    a plurality of headlights including reflectors disposed in the front of the vehicle;
    a plurality of driving lights having a transverse cutoff beam disposed in the front of the vehicle behind the headlights;
    a control unit connected to the driving lights for varying an amount of power supplied to the driving lights based on a plurality of steering deflections of a plurality of wheels of the vehicle;
    a sensor being connected to a steering column of the vehicle and the control unit, the sensor measuring the rotations of the column and providing a plurality signals representing the steering deflections of the wheels of the vehicle to the control unit.

11. Apparatus according to claim 10, wherein the control unit comprises a computer for determining a plurality of power levels to be supplied to the driving lights based on the rotation measurements and outputting a plurality of signals corresponding to the determined power levels; and an amplifier receiving the signals and generating power to the driving lights in response to the signals.

12. A method utilizing a plurality of driving lights of a vehicle to illuminate the bends of the road ahead of the vehicle, the method comprising the steps of:

determining a plurality of steering deflections of a plurality of wheels of the vehicle; and varying an amount of power supplied to the lights as a function of the deflections.

13. Method according to claim 12, further including the steps of measuring a plurality of rotations of a steering column of the vehicle and varying an amount of power supplied to the lights as a function of the measurements.

14. Method according to claim 13, further including the steps of receiving a plurality of the measurement signals corresponding to the rotation measurements and filtering the signals.

15. Method according to claim 12, further including the step of keeping the lights extinguished until the steering deflection exceeds a predetermined threshold value.

16. Method according to claim 12, further including the step of progressively increasing an amount of power supplied to a first light on the side of the vehicle towards which the vehicle is running.

17. Method according to claim 16, further including the steps of keeping the. first light extinguished until the steering deflection exceeds a predetermined threshold value and supplying a second light on the side of the vehicle steered on the bend with constant power beyond the threshold value of the steering deflection.

18. Method according to claim 16, further including the step of temporarily supplementing the power applied to the first light at high values of the steering deflection.

19. Method according to claim 12, further including the steps of energizing the lights simultaneously and extinguishing the lights simultaneously.

20. A light apparatus for a motor vehicle having a steering system, comprising:

at least one light generating device; and a control system for varying an amount of power supplied to the at least one light generating device as a function of a steering deflection associated with the steering system.

21. A method of operating at least one light generating device for a motor vehicle having a steering system, comprising:

determining a steering deflection associated with the steering system; and varying an amount of power supplied to the at least one light generating device as a function of the steering deflection.

* * * * *